United States Patent
Hyakusoku et al.

[11] Patent Number: 6,138,824
[45] Date of Patent: Oct. 31, 2000

[54] HARD DISK CARRIER

[75] Inventors: Yuichi Hyakusoku; Mitsugi Maekawa, both of Tokyo, Japan

[73] Assignee: Mediken, Inc., Tokyo, Japan

[21] Appl. No.: 09/471,270

[22] Filed: Dec. 23, 1999

[30] Foreign Application Priority Data

Dec. 28, 1998 [JP] Japan ................................. 10-373191

[51] Int. Cl.[7] ................................................ B65D 85/30
[52] U.S. Cl. ........................ 206/307; 206/445; 206/454; 206/493
[58] Field of Search .................................. 414/936, 941; 206/454, 710, 711, 712, 445, 493, 307, 308.1

[56] References Cited

U.S. PATENT DOCUMENTS

| | | | |
|---|---|---|---|
| 4,253,571 | 3/1981 | Keohan | 206/445 X |
| 5,551,571 | 9/1996 | Lin et al. | 206/710 |
| 5,882,168 | 3/1999 | Thompson et al. | 414/416 |
| 5,899,658 | 5/1999 | Hofmeister | 414/744.5 |
| 6,027,301 | 2/2000 | Kim et al. | 414/416 |

*Primary Examiner*—Jacob K. Ackun
*Attorney, Agent, or Firm*—Sughrue, Mion, Zinn, Macpeak & Seas, PLLC

[57] ABSTRACT

A hard disk carrier includes a core rod for collectively holding hard disks in a state of piercing center holes of the hard disks arranged in the axial direction with predetermined separations, a release means for collectively disengaging the holding state of the hard disks by the core rod, a container body for accommodating the hard disks held by the core rod and a cover body for sealing the opening of the container body accommodated with the hard disks.

11 Claims, 6 Drawing Sheets

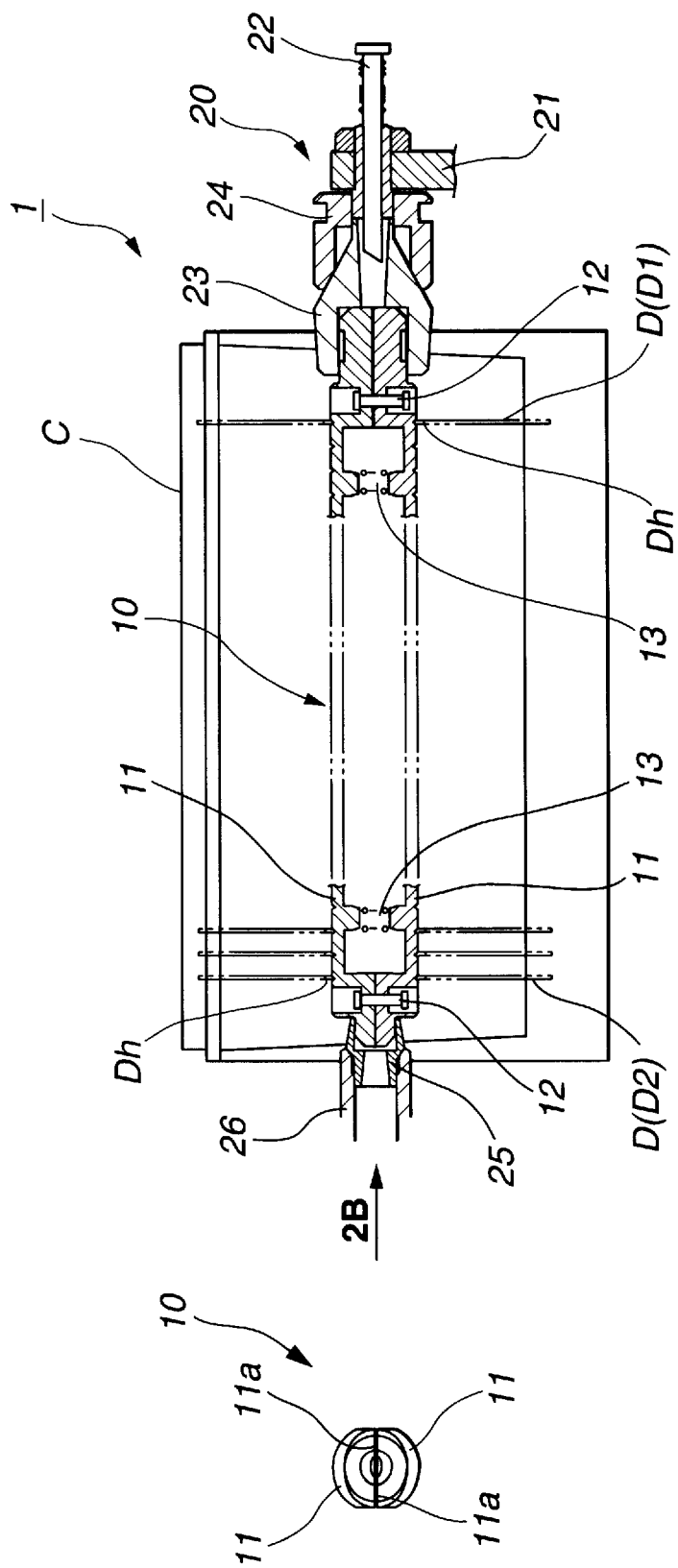

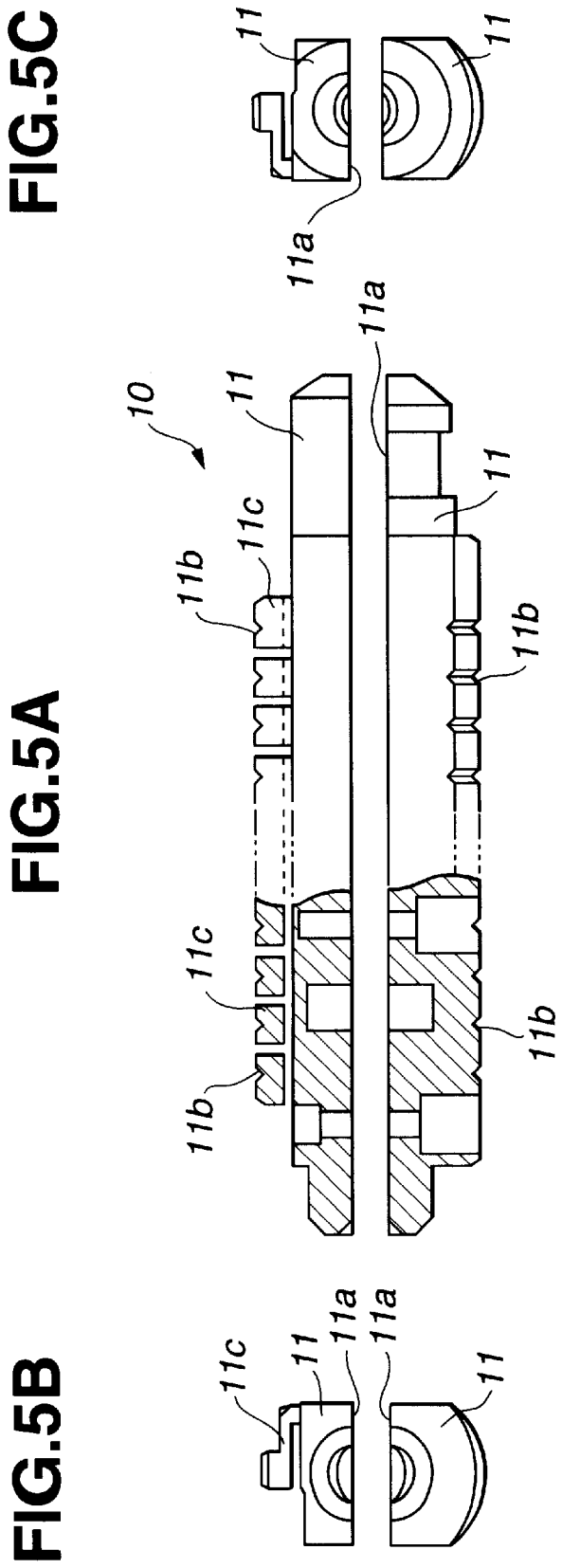

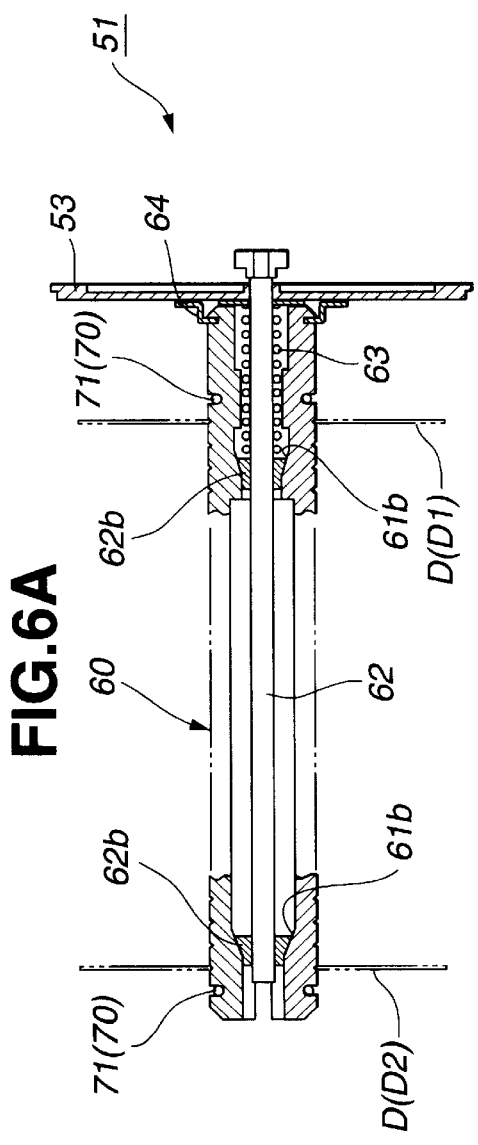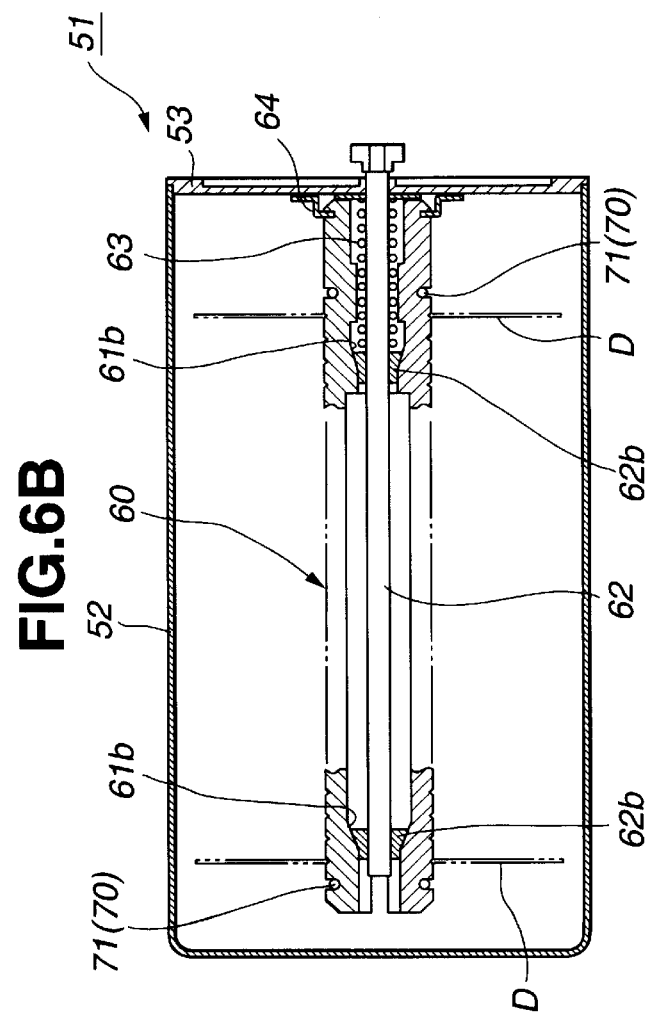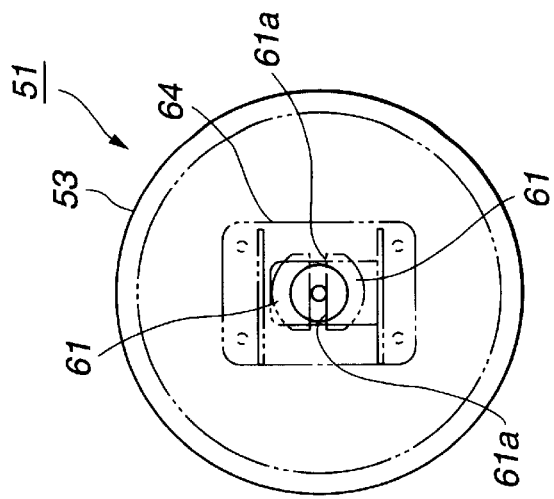

HARD DISK CARRIER

BACKGROUND OF THE INVENTION

1. Field of the Invention

This invention relates to a hard disk carrier used suitably for containing hard disks such as magnetic disks, optical disks and so (including dick bases) used as external strage of computers for example, and for carrying them in a workshop or between workshops from one to the other.

2. Description of the Prior Art

Heretofore, there has been used an apparatus provided with a case having disk-engaging grooves for holding a plurality of hard disks in the axial direction with predetermined spaces and a cover for sealing the case as a hard disk carrier as mentioned above, and the cover is so designed as to be attached to the case by engaging fittings provided on both ends of the cover to receivers provided to the case.

In a case of carrying the hard disks by the above-mentioned hard disk carrier, first of all, the hard disks are fitted into the disk-engaging grooves of the case one by one on the loading side of the disks, the case is attached with the cover, and then the hard disk carrier is brought out after packing up the whole body including the case containing the hard disks and the cover with resin film. On the unloading side where the hard disk carrier is brought in, the cover is removed from the case after unpacking the hard disk carrier and then the hard disks are taken out from the case of the carrier one by one.

However, in the above-mentioned conventional hard disk carrier, the hard disks are required to be packed into and taken out from the case of the carrier one at a time, therefore there is a problem in that time required for these operations becomes longer, and there is another problem in that there is highly the possibility of undesirably sticking of dust or oily substance on the hard disks because it is necessary to grasp the hard disk at the outer peripheral part at the time of packing and taking out operations of the hard disks.

Furthermore, in the aforementioned hard disk carrier, the cover is so designed as to be attached to or detached from the case of the carrier according to the engagement or the disengagement between the fittings of the cover and the receivers of the case, and there is the other problem in that it is not possible to say that there is no possibility that dust or ions, which are generated by abrasion caused by friction between the fittings and the receiver at the time of attaching or detaching the cover, has a bad influence on the hard disks, especially on the hard disks positioned in the both ends of the case.

SUMMARY OF THE INVENTION

Therefore, this invention is made in view of the aforementioned problems in the conventional hard disk carrier, it is an object to provide a hard disk carrier which is possible to carry out the packing and taking out operations of the hard disks easily in a short time, and possible to prevent the hard disks from the sticking of dust and oily substance, further possible to inhibit the generation of dust and ions exerting a baneful influence on the hard disks.

The hard disk carrier according to this invention has the construction comprising a core rod for collectively holding a plurality of hard disks in a state of piercing the respective center holes successively from one end to the other end of the hard disks arranged in an axial direction with predetermined separations; a release means for collectively disengaging the hard disks from the core rod; a container body for accommodating the hard disks held by the core rod; and a cover body for sealing an opening of the container body accommodated with the hard disks, and such the construction of the hard disk carrier is introduced as a means of solution for the aforementioned problems of the prior art.

The hard disk carrier according to a preferable embodiment of this invention has construction in that the hard disks are accommodated in the container body in a state out of contact with the container body by supporting a top end of the core rod with the container body and supporting a base end of the core rod with the cover body, the hard disk carrier according to another preferable embodiment of this invention has construction in that the container body and cover body are formed in hollow cylindrical shapes having bottoms respectively, and opening edges of the container body and the cover body are closely in contact with each other by contracting one of the opening edges of the container body and the cover body to be fitted with each other and enlarging the other opening edge of them, and the hard disk carrier according to the other embodiment of this invention has construction in that the opening edge of the container body is contracted.

The hard disk carrier according to the other preferable embodiment of this invention has construction in that the core rod is provided with two bars disposed in substantially parallel with each other, a pin for connecting the two bars movably in closing and separating directions and an elastic body for energizing the two bars in the separating direction; and the release means is provided with a collet to be fitted on the base end of the core rod and a liner for reducing an inner diameter of the collet. The hard disk carrier according to the other preferable embodiment of this invention has construction in that the core rod is provided with two bars disposed in substantially parallel with each other and supported movably in closing and separating directions by the cover body and a pressure pin to be inserted between the two bars so as to move the two bars in the separating direction; and the release means is provided with an elastic body for energizing the two bars in the closing direction.

Furthermore, the hard disk carrier according to another desirable embodiment of this invention has construction in that the bars of the core rod are formed with grooves for restraining the hard disks so as not to move in the axial direction of the core rod, the hard disk carrier according to a further desirable embodiment of this invention has construction in that each of the grooves is formed in respective resilient pieces disposed on at least one of the two bars of the core rod independently from each other so as to elastically contact the grooves with the respective hard disks, and the hard disk carrier according to the other desirable embodiment of this invention has construction in that the core rod is connected with a robot arm detachably at the end thereof.

In the hard disk carrier according to this invention, it is desirable to apply materials with electric conductivity to the components such as the core rod, the container body and the cover body in order to prevent dust floating in the air to stick on them owing to electrostatic force, and further desirable to apply aluminium materials for the container body and the cover body in order to realize also the light weight design of the hard disk carrier.

BRIEF DESCRIPTION OF THE DRAWINGS

FIG. 2A is a longitudinal sectional view illustrating a state where the core rod of the hard disk carrier shown in FIG. 1 is inserted into the center holes of the hard disks placed in the case on the loading side;

FIG. 2B is an end view of the core rod shown in FIG. 2A in the direction shown with arrow 2B;

FIG. 5A is a partially sectional front view of another preferable embodiment of the core rod of the hard disk carrier shown in FIG. 1;

FIGS. 5B and 5C are left and right side views of the core rod shown in FIG. 5A, respectively;

FIG. 6A is a longitudinal sectional view illustrating another embodiment of the hard disk carrier according to this invention in a state where the plurality of hard disks are collectively held by the core rod;

FIG. 6B is a longitudinal sectional view illustrating a state where the hard disks shown in FIG. 6A is accommodated in the container body; and FIG. 6C is a front view of the cover body shown in FIGS. 6A and 6B.

DETAILED DESCRIPTION OF THE INVENTION

Figure 1A:
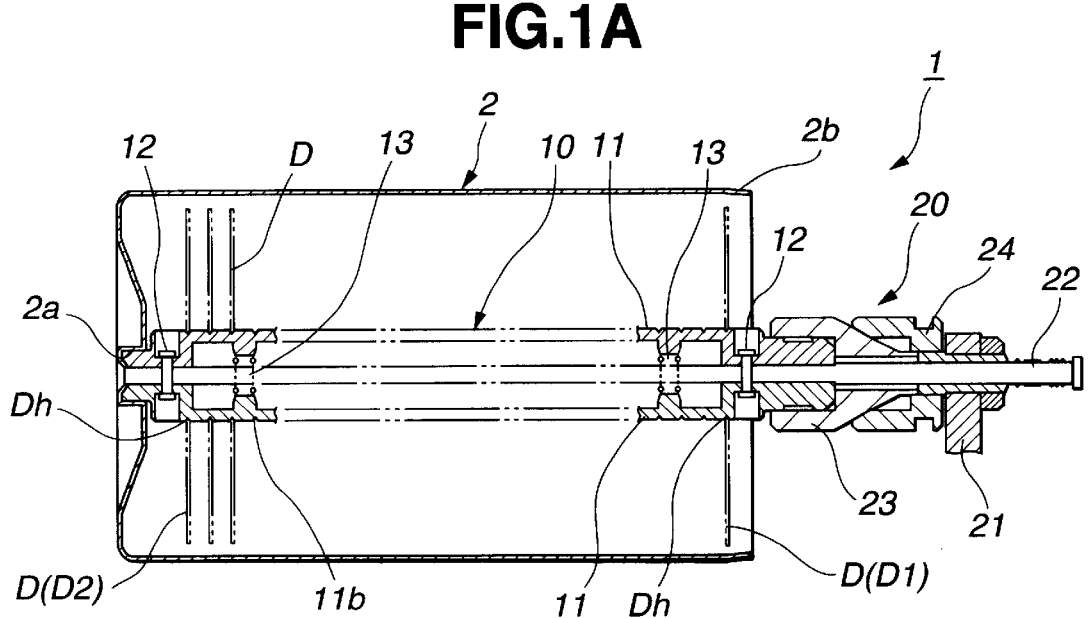
FIG. 1A is a longitudinal sectional view illustrating an embodiment of the hard disk carrier according to this invention in a state where the plurality of hard disks collectively held by the core rod are accommodated in the container body.

In the hard disk carrier according to this invention, which comprises the core rod, the release means, the container body and the cover body, and is so designed as to hold the plurality of hard disks collectively by inserting the core rod into center holes of the hard disks and as to disengage the hard disks collectively from the core rod by the release means, therefore packing and taking out of the hard disks against the container body are carried out collectively by the core rod at the same time at the time of carrying the plurality of hard disks from one to another, and disengagement of the hard disks from the core rod is also carried out collectively by the release means at the same time. Accordingly, the packing and taking out operations of the hard disks become easier and the working hour required for these operations is reduced.

Furthermore, sticking of dust or oily substance is avoidable by carrying out the packing and the taking out of the hard disks without grasping the outer peripheral parts of the respective hard disks.

In the hard disk carrier according to the first embodiment of this invention of which core rod is supported by the container body and the cover body at the both ends thereof, flaws are never induced on the outer peripheral parts of the hard disks at the transportation since the hard disks accommodated in the container body do not come in touch with an inner peripheral wall of the container body. In the hard disk carrier according to the second embodiment of this invention, opening edges of the container body and the cover body having hollow cylindrical shapes with bottoms are closely in contact with each other by contracting one of their opening edges and enlarging the other opening edge of them, accordingly there is almost no abrasion caused by friction between the opening edge of the container body and the cover body at the time of attaching or detaching the cover body against the container body, thereby restraining the generation of dust or ions in an extremely low level. In the hard disk carrier according to the third embodiment of this invention of which cover body is put on the outer side of the contracted opening edge of the container body, dust is prevented to enter into the container body at the time of attaching or detaching the cover body against the container body even if the dust sticks on the outer periphery of the opening edge of the container body or the inner periphery of the opening edge of the cover body.

In the hard disk carrier according to the fourth embodiment of this invention, which is provided with the core rod having the two parallel bars, the pin movably connecting the both bars and the elastic body for separating the both bars, and the release means having the collet to be fitted on the core rod and the liner for bringing the both bars closer through the collet, the plurality of hard disks are collectively held by the core rod easily and infallibly, and disengaged smoothly from the core rod by the release means at the same time. In the hard disk carrier according to the fifth embodiment of this invention, which is provided with the core rod having the two parallel bars movably supported by the cover body and the pressure pin for separating the both bars, and the release means having the elastic means for bringing the both bars closer, the plurality of hard disks are collectively held by the core rod easily and infallibly, and disengaged smoothly from the core rod by the release means at the same time similarly to the carrier according to the fourth embodiment of this invention. Additionally, in the hard disk carrier according to the sixth embodiment of this invention of which core rod is provided with the bars formed with grooves to be fitted with the hard disks, the plurality of hard disks collectively held by the core rod are securely prevented to move on the core rod.

Furthermore, in the hard disk carrier according to the seventh embodiment of this invention, the grooves are formed individually in respective resilient pieces disposed on the bar of the core rod independently from each other, therefore, the respective hard disks touch elastically with the bar of the core rod through the resilient pieces and are firmly held by the core rod even if the hard disks vary in size of their center holes. In the hard disk carrier according to the eighth embodiment of this invention of which core rod is connected with an arm of working robot detachably, it becomes easier to cope with automation of the packing and taking out operations of the plurality of hard disks.

DESCRIPTION OF THE PREFERRED EMBODIMENTS

This invention will be described below on the basis of the drawings.

FIG. 1 to FIG. 4 show an embodiment of the hard disk carrier according to this invention.

The hard disk carrier 1, as shown in FIG. 1, is provided with a core rod 10 for holding the plurality (25 pieces on an ordinary occasion) of hard disks D, a release means 20 for disengaging the holding state of the hard disks D by the core rod 10, a container body 2 for accommodating the hard disks D held by the core rod 10, and the cover body 3 for sealing an opening of the container body 2.

Figure 4A:
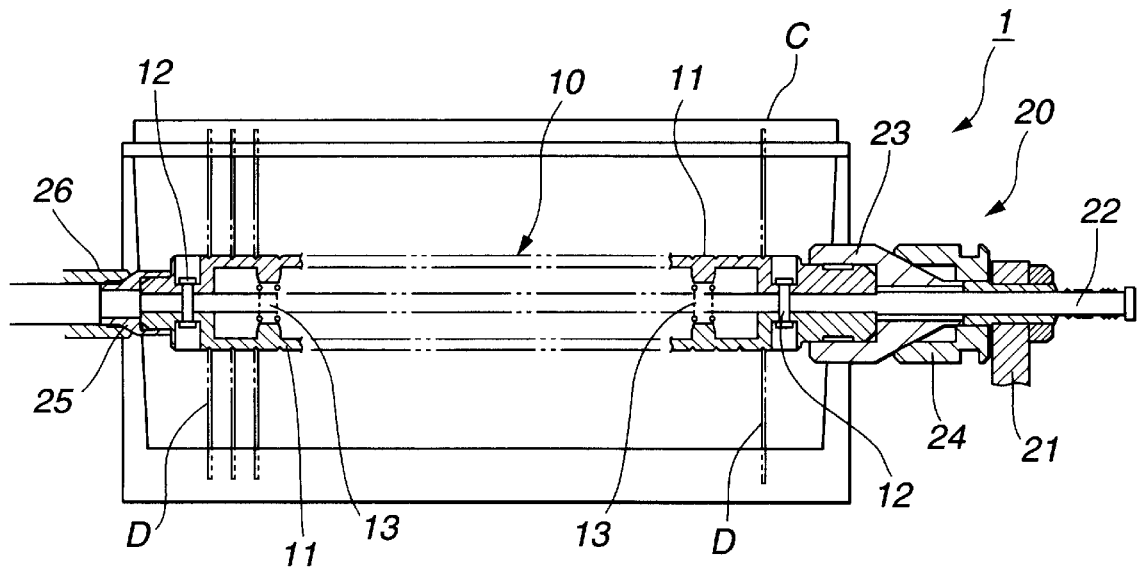
FIG. 4A is a longitudinal sectional view illustrating a state before the hard disks are collectively taken out from the case on the loading side by the core rod of the hard disk carrier shown in FIG. 1.
Figure 4B:
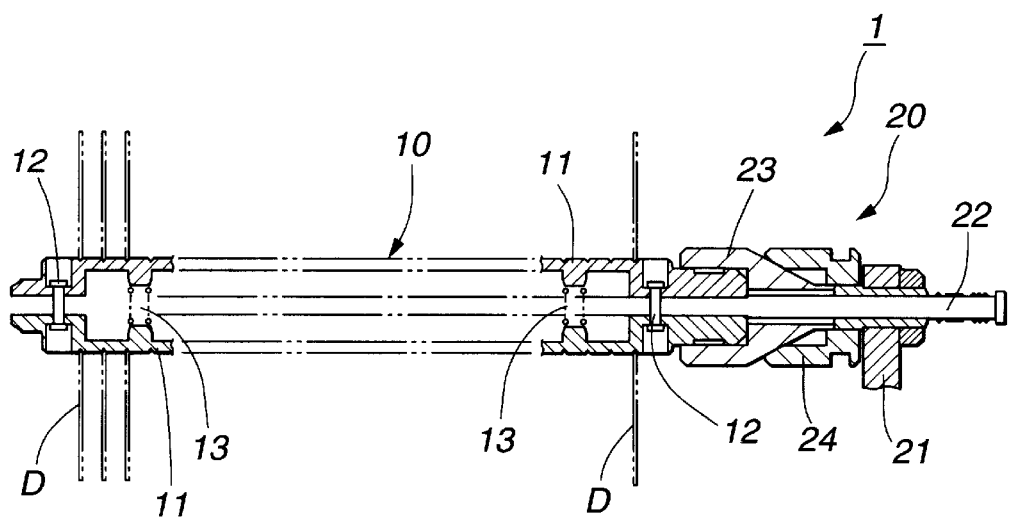
FIG. 4B is a longitudinal sectional view illustrating a state where the hard disks have been collectively taken out from the case on the loading side by the core rod shown in FIG. 4A.

As shown also in FIGS. 3 and 4, the core rod 10 is provided with two bars 11,11 formed in half-cut cylindrical shapes and disposed in parallel with each other, pins 12,12 intervening between both ends of the bars 11,11 for connecting the bars 11,11 of which half-cut faces 11a,11a are disposed opposite to each other, movably in the closing and separating directions, and coil springs (elastic body) 13,13 intervening between the both ends of the bars 11,11 for energizing the bars 11,11 in the separating direction from each other.

The core rod 10 is so designed as to be inserted into center holes Dh of the plurality of hard disks D arranged in a row in the axial direction with the predetermined separations from the center hole Dh of the hard disk D1 placed on an end toward the center hole Dh of the hard disk D2 placed on the other end, and as to hold the hard disks D collectively in the piercing state by pressing the two bars 11,11 against the center holes Dh of the hard disks D with the elastic force of the coil springs 13,13.

In this case, the bar 11 is formed with the plurality of grooves 11b to receive inner peripheral parts of the center holes Dh of the hard disks D in order to restrain the hard disks D held collectively to move in the axial direction.

On the other side, the release means 20 is provided with a base 21, a shaft member 22 supported slidably to the base 21 so as to be extractably inserted between the bars 11,11 of the core rod 10, a collet 23 put onto the shaft member 22 so as to be fitted on the base end of the bars 11,11 of the core rod 10 and a liner 24 put onto the shaft member 22 between the base 21 and the collet 23. The release means 20 is so designed as to disengage the holding state of the hard disks D by the core rod 10 at the same time by moving the two bars 11,11 away from the center holes Dh of the respective hard disks D against the elastic force of the coil springs 13,13 by shifting the liner 24 in the separating direction from the base 21 in a state of inserting the shaft member 22 between the bars 11,11 of the core rod 10 as shown in FIG. 2, and reducing the inner diameter of the collet 23.

The container body 2 and the cover body 3 are formed in hollow cylindrical shapes having bottoms, respectively. The container body 2 is formed with a depression 2a at the center of the bottom for supporting the core rod 10 by engaging with the top ends of the bars 11,11 of the core rod 10, and the cover body 3 is also formed with a depression 3a at the center of the bottom for supporting the core rod 10 by engaging with the base ends of the bars 11,11 of the core rod 10, whereby the top end and the base end of the core rod 10 are supported respectively by the both depressions 2a and 3a in a state of sealing the opening of the container body 2 with the cover body 3, and the plurality of hard disks D held by the core rod 10 can be accommodated in the container body 2 without contact with the inner peripheral wall of the container body 2.

In this case, an opening edge 2b of the container body 2 is contracted slightly and an opening edge 3b of the cover body 3 is slightly enlarged so that the both opening edges 2b and 3b are closely in contact with each other in the state of fitting the opening edge 3b of the cover body 3 onto the opening edge 2b of the container body 2.

Furthermore, the hard disk carrier 1 is designed so as to enable the release means 20 to be furnished to an arm of the working robot (not shown), whereby the core rod 10 can be attached to or detached from the robot arm through the release means 20.

Additionally, numerals 25 and 26 in FIGS. 2 and 4 show an auxiliary collet and an auxiliary liner, respectively. The auxiliary collet 25 and the auxiliary liner 26 have the same function as that of the collet 23 and the liner 24 of the release means 20 and are used together with the release means 20 at the time of packing and taking out the hard disks D against the container body 2 and the time of disengaging the hard disks D from the core rod 10.

In a case of carrying the hard disks D by using the aforementioned hard disk carrier 1, first of all, the shaft member 22 of the release means 20 is inserted between the bars 11,11 of the core rod 10 and the collet 23 and the auxiliary collet 25 are fitted on the base end and the top end of the core rod 10, respectively on the loading side.

Next, the two bars 11 and 11 are brought closer to each other against the elasticity of the coil springs 13,13 and the outernal diameter of the core rod 10 is made smaller than the inside diameter of the center holes Dh of the hard disks D by getting near the liner 24 and the auxiliary liner 26 to each other and reducing the respective inner diameters of the collet 23 and the auxiliary collet 25 in this state. After then, the core rod 10 with the diameter reduced by the collets 23 and 25 is inserted into the center holes Dh of the hard disks D arranged in an ends-open type case C on the loading side in the axial direction with predetermined separations from the center hole Dh of the hard disk D1 placed on one end to the center hole Dh of the hard disk D2 placed on the other end as shown in FIG. 2A.

Subsequently, after adjusting positions of the respective grooves 11b of the bars 11,11 with the hard disks D, the two bars 11,11 are pressed against the center holes Dh of the hard disks D by the elastic force caused by the coil springs 13,13 by separating the liner 24 and the auxiliary liner 26 of the release means 20 from each other and restoring the collet 23 and the auxiliary collet 25 to their original inner diameters. Whereby the plurality of hard disks D are collectively held by the core rod 10 with the predetermined separations in the piercing state as shown in FIG. 3 (the release means 20 and the auxiliary collet 25 are simplified in FIG. 3A).

Figure 1B:
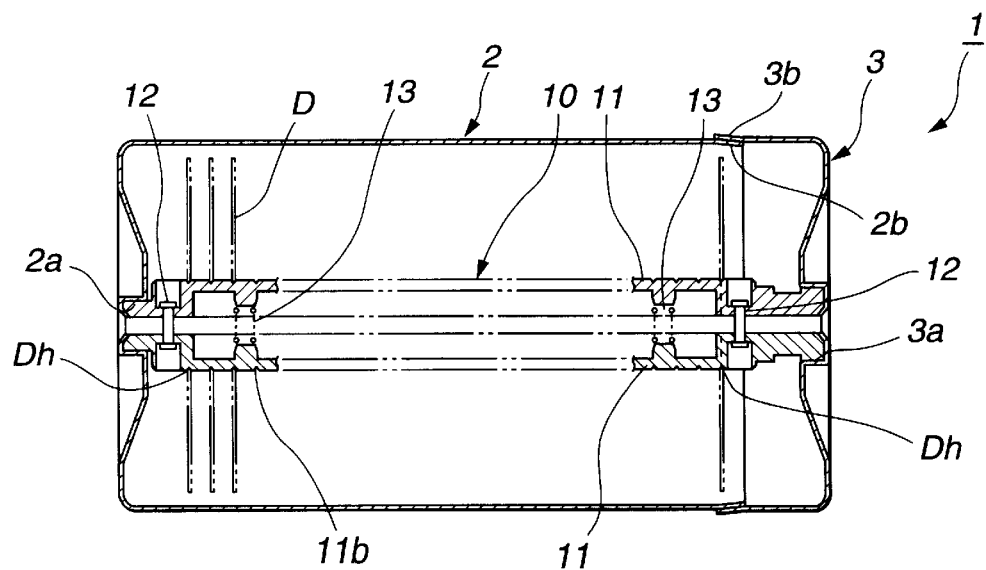
FIG. 1B is a longitudinal sectional view illustrating a state where the container body shown in FIG. 1A is sealed by the cover body.
Figure 3D:
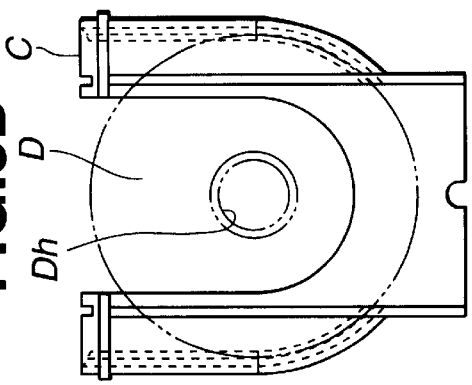
FIG. 3D is a front view of the case on the loading side shown in FIGS. 3A and 3B.
Figure 3A:
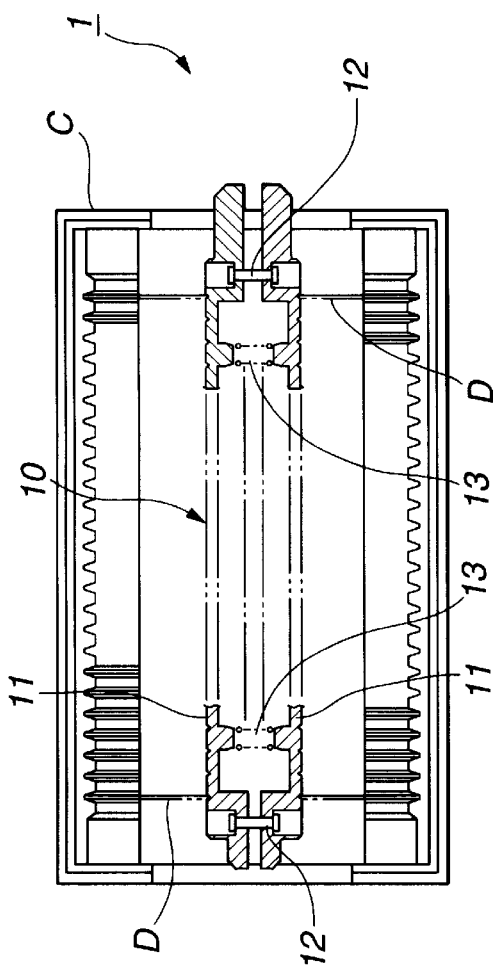
FIG. 3A is a horizontal sectional view illustrating a state where the hard disks placed in the case on the loading side are collectively held by the core rod of the hard disk carrier shown in FIG. 1.
Figure 3B:
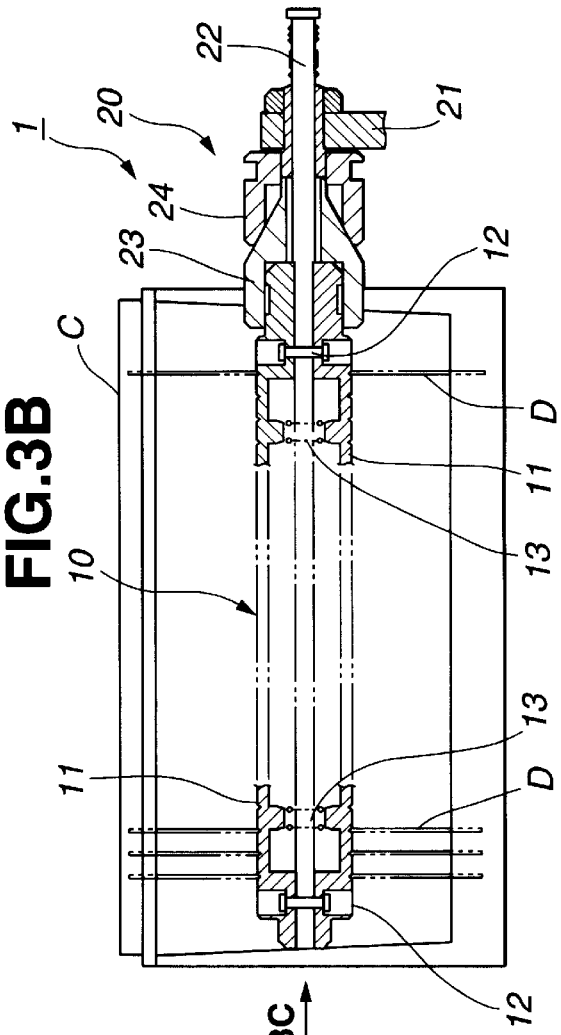
FIG. 3B is a vertical sectional view of the hard disk carrier shown in FIG. 3A.
Figure 3C:
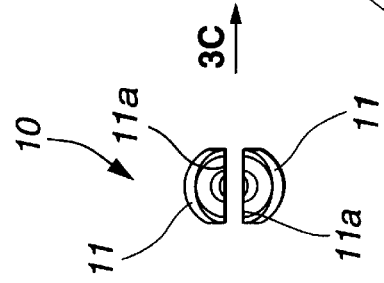
FIG. 3C is an end view of the core rod shown in FIG. 3B in the direction shown with arrow 3C.

Furthermore, after the core rod 10 correctively holding the hard disks D is taken out from the case C and the auxiliary collet 25 is removed from the core rod 10 as shown in FIG. 4, the core rod 10 is inserted into the opened container body 2 together with the hard disks D and the top end of the core rod 10 is engaged to the depression 2a of the container body 2 as shown in FIG. 1A. Successively, the opening of the container body 2 is sealed with the cover body 3 after separating the release means 20 from the core rod 10 as shown in FIG. 1B, and then the hard disk carrier 1 contained with the hard disks D is transported after packing up the whole body of the carrier 1 with resin film. In this time, the base end of the core rod 10 is engaged to the depression 3a of the cover body 3.

On the unloading side where the hard disk carrier 1 is received, the cover body 3 is detached from the container body 2 after removing the resin film from the carrier 1, the shaft member 22 of the release means 20 is inserted between the bars 11,11 of the core rod 10 and the collet 23 is fitted onto the base end of the core rod 10. The hard disks D collectively held in the piercing state by the core rod 10 inserted into the center holes Dh of the hard disks D are taken out from the container body 2 together with the core rod 10, subsequently the hard disks D are carried by the core rod 10 to an ends-open type case C on the unloading side and fitted into the case C. After this, the transportation of the plurality of hard disks D is completed by pulling out the core rod 10 from the center holes Dh of the hard disks D placed in the case C of the unloading side after getting near the two bars 11 and 11 of the core rod 10 against the elasticity of the coil springs 13,13 by the collets 23 and 25 in the same manner as described above.

Accordingly, the packing operation and the taking out operation of the plurality of hard disks D become easier and the time required for these operations can be reduced by applying the hard disk carrier 1 to the transportation of the hard disks D, since the packing and the taking out of the hard disks D against the container body 2 are carried out collectively by the core rod 10, and the disengagement of the hard disks D from the core rod 10 is also carried out collectively by the release means 20.

In this time, the hard disks D can be prevented from the sticking of dust or oily substance because the packing and the taking out of the hard disks 10 is carried out without grasping the outer peripheral parts of the hard disks D.

Also in the hard disk carrier 1, it is avoidable to generate flaws on the outer peripheral parts of the hard disks D during the transportation since the hard disks D contained in the container body 2 are out of contact with the inner peripheral wall of the container body 2.

Further in this hard disk carrier 1, the opening edge 2b of the container body 2 is slightly contracted and the opening edge 3b of the cover body 3 is slightly enlarged so as to contact the both opening edges 2b and 3b closely with each other in the state of fitting the opening edge 3b of the cover body 3 onto the opening edge 2b of the container body 2, and there is almost no abrasion caused by the friction between the opening edges 2b and 3b of the container body 2 and the cover body 3 even at the time of attaching or detaching the cover body 3 against the container body 2, consequently it is possible to restrain the generation of dust or ions, which bring about the trouble on the hard disks D, in the extremely low level. Further, dust sticking on the outer periphery of the opening edge 2b of the container body 2 or the inner periphery of the opening edge 3b of the cover body 3 can be prevented to enter in the container body 2 since the opening edge 3b of the cover body 3 is so designed as to be put on the outside of the contracted opening edge 2b of the container body 2 in this embodiment.

Furthermore, in the hard disk carrier 1 as mentioned above, the bars 11 of the core rod 10 are formed with the plurality of grooves 11b and the hard disks D collectively held by the core rod 10 are prevented to move in the axial direction more firmly, additionally it becomes possible to cope with the automatic operation of the packing and taking out of the plurality of the hard disks D against the container body 2 because the hard disk carrier 1 is designed so as to connect and disconnect the core rod 10 to and from the robot arm (not shown) through the release means 20 in this embodiment.

Another preferable embodiment of the core rod 10 is shown in FIG. 5.

As shown in FIG. 5, the core rod 10 in this embodiment is provided with two bars 11,11 disposed in parallel and energized in the separating direction from each other by the elasticity of the coil springs 13,13 (not shown) similarly to the aforementioned core rod 10 shown in FIGS. 1 to 4.

The upper side bar 11 of the both bars in FIG. 5 is provided resilient pieces 11c as many as the number of the hard disks D to be held by the core rod 10 in a time (25 pieces in this example) independently from each other, and each of the resilient pieces 11c is formed with a groove 11b in the upper face thereof. The core rod 10 having the aforementioned structure is inserted into the center holes Dh of the hard disks D in the state of taking the two bars 11,11 close to each other by the collets 23 and 25, and then the hard disks D are collectively held in the state where the hard disks D are respectively fitted into the grooves 11b of the core rod 10 by actuating the liners 24 and 26 of the release means 20 in the same manner as mentioned above.

In the hard disk carrier 1 provided with the above-mentioned core rod 10 having the bar 11 formed with the resilient pieces 11c, each of the hard disks D is held by the core bar 10 elastically through the respective resilient piece 11b, therefore all of the hard disks D can be collectively held by the core rod 10 very firmly even if the center holes Dh of the hard disks 10 vary widely in size.

FIG. 6 show the other embodiment of the hard disk carrier according to this invention.

The hard disk carrier 51 is provided, as shown in FIG. 6, with a core rod 60 for holding the plurality of the hard disks D, a release means 70 for disengaging a holding state of the hard disks D by the core rod 51, a container body 52 for accommodating the hard disks D held by the core rod 60, and a cover 53 for sealing the opening of the container body 52.

The core rod 60 is provided two bars 61,61 formed in half-cut cylindrical shapes, a pressure pin 62 to be inserted between the two bars 61,61 disposed in parallel by opposing the half-cut faces 61a,61a with each other, and a coil spring 63 for energizing the pressure pin 62 in the left side in FIGS. 6A and 6B. The two bars 61,61 are disposed so as to be movable in the closing and separating directions with each other by supporting their respective base ends at the cover body 53 through a bracket 64 in movable upwardly and downwardly in FIGS. 6B and 6C. The pressure pin 62 is provided with truncated cone-shaped cams 62b,62b in one body at the both end thereof, and so designed as to be energized on the left side in FIGS. 6A and 6B by the elastic force of the coil spring 63 and to move the two bars 61,61 of the core rod 60 in the separating direction from each other by pressing pressure slants 61b,61b formed on the half-cut faces 61a,61a of the bars 61,61 with the cams 62b,62b.

The core rod 60 is possible to hold the plurality of hard disks D collectively in the piercing state by pressing the two bars 61,61 against the center holes Dh of the hard disks D through the pressure pin 62 after inserting the core rod 60 into the center holes Dh of the hard disks D arranged in a line in the axial direction with the predetermined separations from the hard disk D1 placed at one end to the hard disks D2 placed at the other end.

The release means 70 is provided with rubber rings (elastic body) 71,71 fitted onto the both ends of the two bars 61,61. In the release means 70, the two bars 61,61 are pulled near to each other according to the elasticity of the rubber rings 71,71 to be separated from the center holes Dh of the hard disks D by moving the pressure pin 62 toward the right side in FIGS. 6A and 6B against the elastic force of the coil spring 63, whereby it is possible to disengage the plurality of the hard disks D collectively from the core rod 60.

Therefore, also in the hard disk carrier 51, the packing operation and the taking out operation of the plurality of hard disks D become easier, and the time required for these operations becomes shorter similarly to the hard disk carrier 1 according to the aforementioned embodiment, because the packing and the taking out of the hard disk D against the container body 52 are carried out collectively by the core rod 60, and the disengagement of the hard disks D from the core rod 60 is also carried out collectively by the release means 70 at the time of transporting the plurality of hard disks D. Furthermore, the hard disks D are prevented from the sticking of dust or oily substance because the packing and the taking out of the hard disks is performed without grasping the outer peripheral parts of the hard disks D.

The detailed structure of the hard disk carrier is not limited only to the aforementioned embodiments.

As mentioned above, in the hard disk carrier according to this invention having the aforementioned construction, it is possible to carry out the packing and the taking out of the plurality of hard disks against the container body collectively and the disengagement of the plurality of hard disks from the core rod at the same time, consequently excellent effects can be obtained in that it is possible to facilitate the packing and taking out operations of the plurality of hard disks and to curtail the time required for these operations, and further possible to prevent the hard disks to be stuck with dust or oil on their outer periphery parts at the time of packing or taking out the hard disks against the container body.

What is claimed is:

1. A hard disk carrier for containing a plurality of hard disks with respective center holes, said carrier comprising:
    a core rod for collectively holding said plurality of hard disks in a state of piercing the respective center holes successively from one end to the other end of said hard disks arranged in an axial direction with predetermined separations;
    a release means for collectively disengaging the hard disks from said core rod;
    a container body for accommodating said hard disks held by said core rod; and
    a cover body for sealing an opening of said container body accommodated with said hard disks.

2. A hard disk carrier as set forth in claim 1, wherein said hard disks are accommodated in the container body in a state out of contact with said container body by supporting a top end of said core rod with the container body and supporting a base end of the core rod with said cover body.

3. A hard disk carrier as set forth in claim 1, wherein said container body and said cover body are formed in hollow cylindrical shapes having bottoms respectively, and opening edges of said container body and said cover body are closely in contact with each other by contracting one of said opening edges of the container body and the cover body to be fitted with each other and enlarging the other opening edge of them.

4. A hard disk carrier as set forth in claim 3, wherein the opening edge of said container body is contracted.

5. A hard disk carrier as set forth in claim 1, wherein said core rod is provided with two bars disposed in substantially parallel with each other, a pin for connecting said two bars movably in closing and separating directions and an elastic body for energizing said two bars in the separating direction; and said release means is provided with a collet to be fitted on the base end of said core rod and a liner for reducing an inner diameter of said collet.

6. A hard disk carrier as set forth in claim 1, wherein said core rod is provided with two bars disposed in substantially parallel with each other and supported movably in closing and separating directions by said cover body and a pressure pin to be inserted between said two bars so as to move the two bars in the separating direction; and said release means is provided with an elastic body for energizing said two bars in the closing direction.

7. A hard disk carrier as set forth in claim 5, wherein said bars of the core rod are formed with grooves for restraining the hard disks so as not to move in the axial direction of said core rod.

8. A hard disk carrier as set forth in claim 7, wherein each of said grooves is formed in respective resilient pieces disposed on at least one of said two bars of the core rod independently from each other so as to elastically contact the grooves with the respective hard disks.

9. A hard disk carrier as set forth in claim 1, wherein said core rod is connected with a robot arm detachably at the end thereof.

10. A hard disk carrier as set forth in claim 2, wherein said container body and said cover body are formed in hollow cylindrical shapes having bottoms respectively, and opening edges of said container body and said cover body are closely in contact with each other by contracting one of said opening efgrs of the container body and the cover body to be fitted with each other and enlarging the other opening edge of them.

11. A hard disk carrier as set forth in claim 6, wherein said bars of the core rod are formed with grooves for restraining the hard disks so as not to move in the axial direction of said core rod.

* * * * *